Nov. 29, 1949 H. M. STUELAND 2,489,469
TRACTOR MOUNTED LOADER
Filed March 7, 1946 3 Sheets-Sheet 1
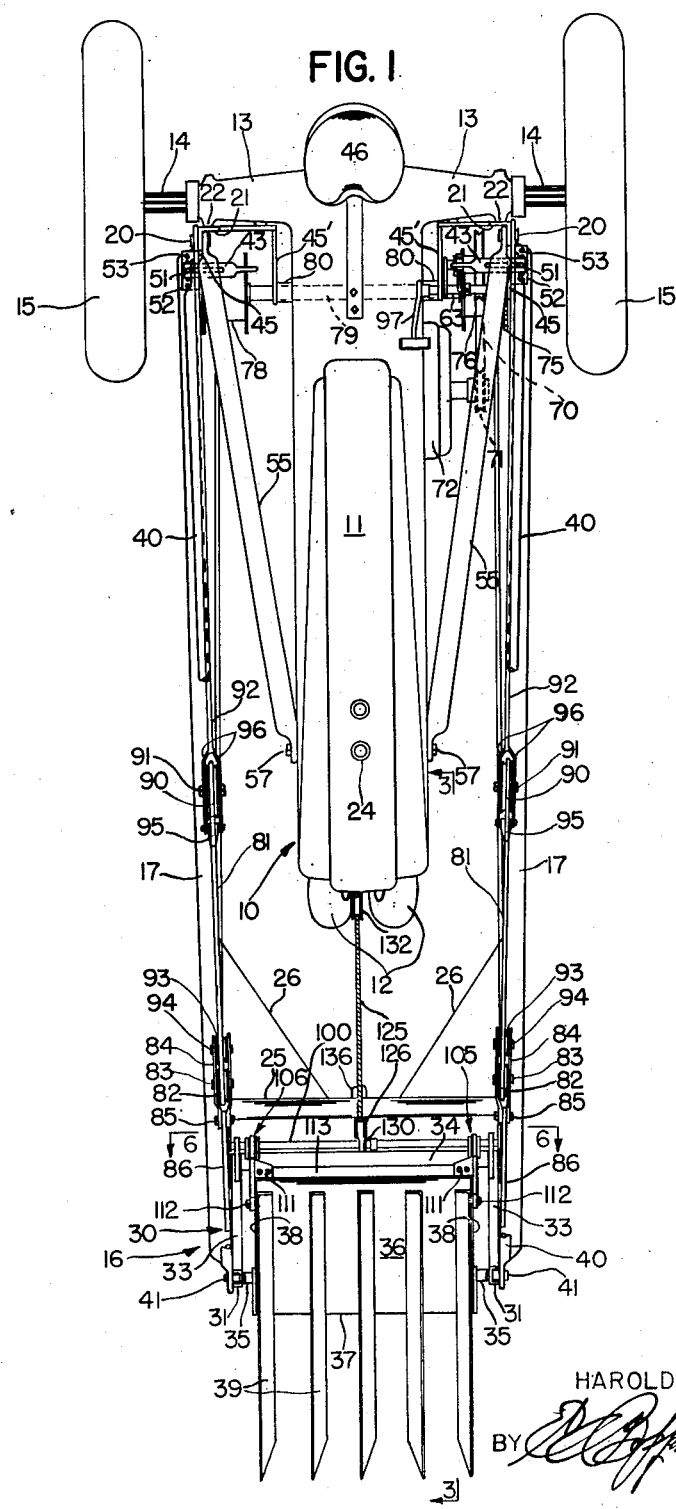
FIG. 1
INVENTOR
HAROLD M. STUELAND
ATTORNEYS

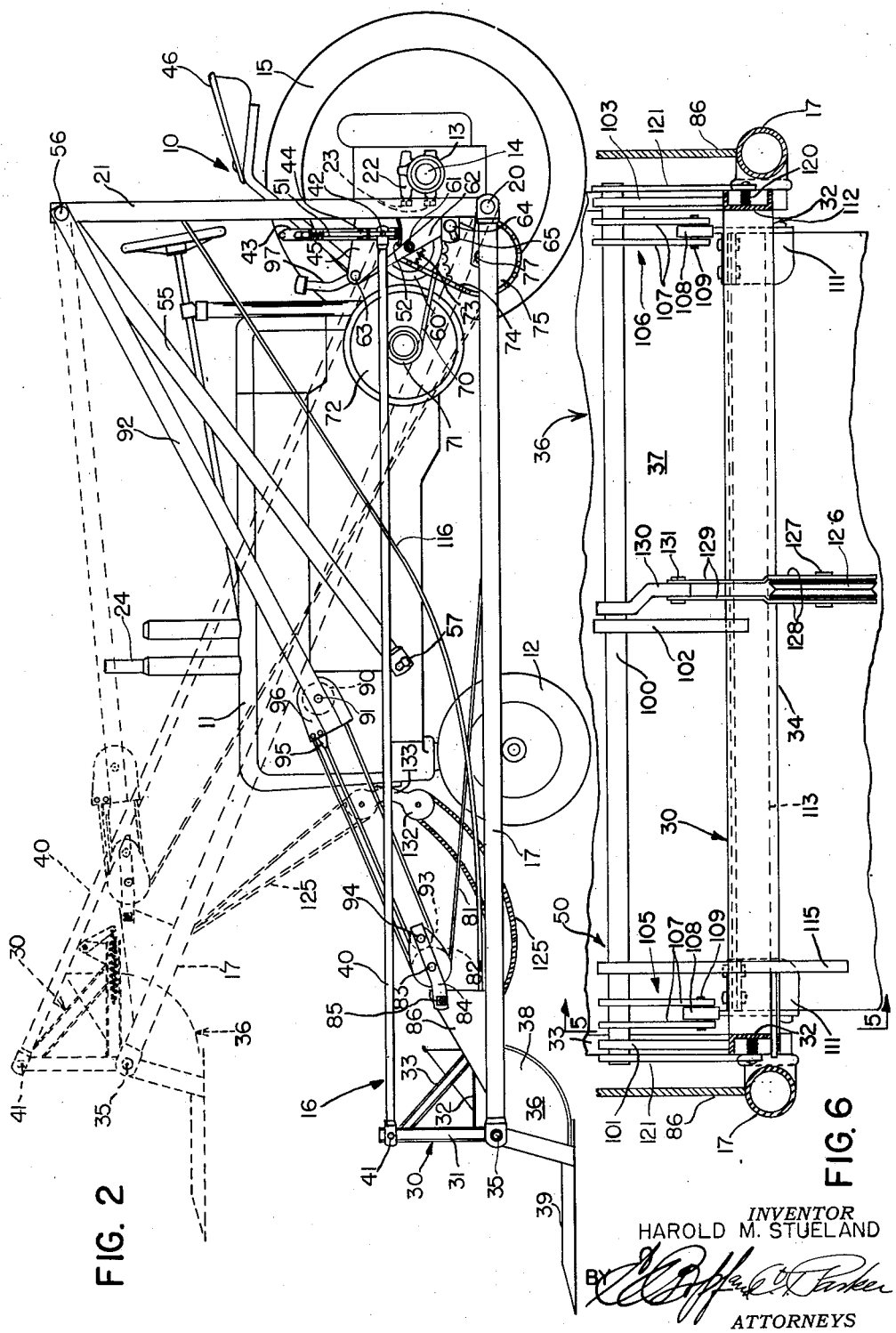

Nov. 29, 1949  H. M. STUELAND  2,489,469
TRACTOR MOUNTED LOADER
Filed March 7, 1946  3 Sheets-Sheet 3
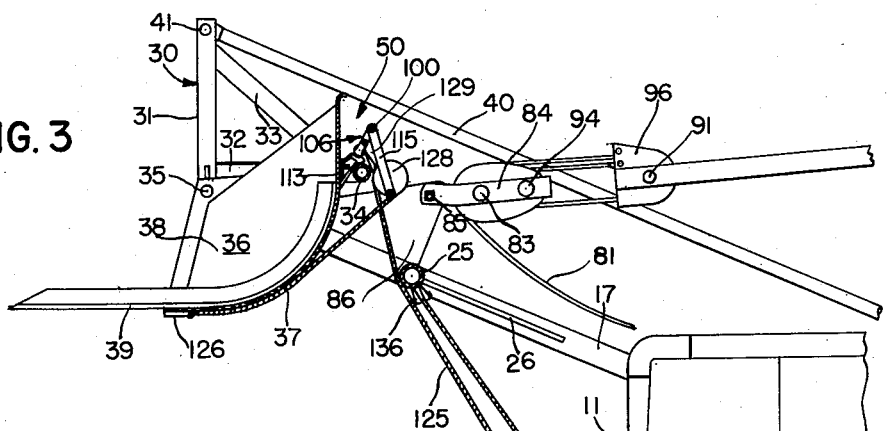
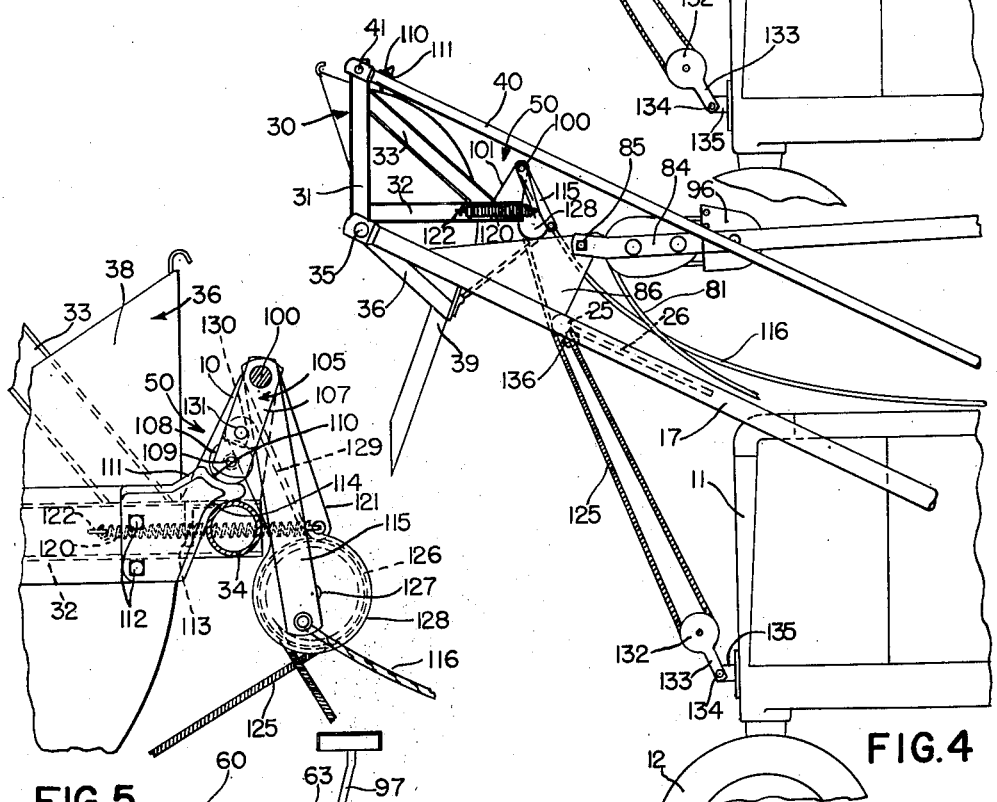
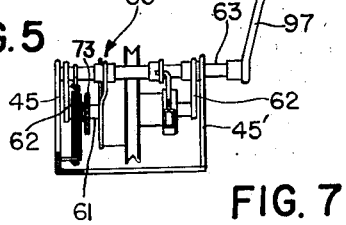
INVENTOR.
HAROLD M. STUELAND
BY
ATTORNEYS.

Patented Nov. 29, 1949

2,489,469

UNITED STATES PATENT OFFICE 2,489,469

TRACTOR MOUNTED LOADER

Harold M. Stueland, East Moline, Ill., assignor to Deere & Company, Moline, Ill., a corporation of Illinois Application March 7, 1946, Serial No. 652,504

10 Claims. (Cl. 214—140)

The present invention relates to tractor mounted loaders of the type comprising a bucket or similar material handling tool disposed at the forward end of the tractor and mounted on arms which extend rearwardly alongside the tractor body. The principal object of my invention relates to the provision of a loader which is more flexible in operation and requires fewer manual operations for its control, but which is simple in construction, strong, and durable.

Another object relates to the provision of a loader in which the forces necessary to load the tool are transmitted more directly between the frame of the tractor and the tool, and thus developing minimum stresses in the tractor frame and in the loader frame. In the accomplishment of this object, the longitudinally extending arms on which the bucket is mounted are pivotally supported on vertical members attached to the front sides of the tractor rear axle housings, while the pivotal connections between the longitudinal arms and the vertical members are spaced substantially beneath the tractor axle housing, in order to minimize the tendency of the tractor body to tip rearwardly while the tractor is pushing the bucket into engagement with a pile of material to be handled thereby.

Still another object relates to the provision of an arrangement of lifting cables in which the force is transmitted therethrough substantially parallel and alongside the main supporting arms of the motor, with the cable drums being located approximately in alignment with the pivotal mountings of the supporting arms.

A still further object relates to the provision of a bucket supporting framework for holding the bucket level during the raising and lowering of the bucket and its supporting arms. A related object has to do with the provision of means for adjusting the level of the bucket to obtain a more or less aggressive scraping action of the forward end of the bucket against the ground.

Another object relates to the provision of a novel and improved means for controlling the dumping of the bucket responsive to raising the latter to a predetermined elevation, thereby eliminating the necessity for the operator to trip the bucket into dumping position manually. A further object relates to a novel and improved latch mechanism for holding the bucket in carrying position, which mechanism is simple, but strong and durable in operation and rigidly secures the bucket in carrying position, and prevents twisting of the bucket in its supporting frame.

Still another object relates to the provision of a novel tripping device which not only releases the latch mechanism but also exerts a force tending to dump the bucket, thereby permitting the operator to shake the bucket on its supporting arms after the bucket has been released for dumping.

These and other objects and advantages of my invention will be apparent to those skilled in the art after a consideration of the following description, in which reference is had to the drawings appended hereto, in which Figure 1 is a top plan view of a tractor mounted loader embodying the principles of the present invention;

Figure 2 is a side elevational view of the tractor mounted loader, showing the bucket and supporting arms in lowered position in solid lines, and showing the bucket in raised position in dotted lines;

Figure 3 is a sectional elevational view, taken along a line 3—3 in Figure 1, and showing the bucket and supporting arms in raised position, with the bucket disposed in carrying position;

Figure 4 is a side elevational view showing the forward end of the tractor and loader, the arms being in raised position, and the bucket in dumping position;

Figure 5 is a fragmentary side elevational view, drawn to an enlarged scale, taken along a line 5—5 in Figure 6, showing the details of the latch mechanism;

Figure 6 is a fragmentary rear elevational view taken along the line 6—6 in Figure 1, showing the details of the latch mechanism; and Figure 7 is an enlarged top view of the clutch and brake assembly.

Referring now to the drawings, the tractor 10 comprises a narrow longitudinally extending body 11 carried on a pair of closely spaced front dirigible wheels 12 under the forward end of the body 11. The rear end of the body is provided with a pair of laterally oppositely extending rear axle housings 13, within which are journaled a pair of drive axles 14 carried on traction wheels 15, respectively.

The loader is indicated in its entirety by reference numeral 16 and includes a pair of main supporting arms 17 extending longitudinally along oposite sides of the tractor body 11, respectively, and swingably connected by a pair of transversely aligned pivots 20 at their rear ends to the lower ends of a pair of vertical mast members 21 secured to the tractor axle housings 13, respectively. Each of the mast members 21 is preferably in the form of a structural angle member, and is rigidly bolted to the conventional implement supporting bosses 22, formed integrally with the tractor axle housings 13, in a manner well known to those skilled in the art. The securing bolts are indicated at 23 in Figure 2, and it will be noted that the masts 21 extend appreciably below the level of the tractor axles 14, and also extend upwardly to a height approximately that of the exhaust pipe 24 of the tractor, so that the tractor with the implement mounted thereon can move through the doors of any barns or sheds through which the tractor can be driven without the loader mounted thereon.

The main supporting arms 17 are rigidly interconnected by a transverse tubular bracing member 25, preferably welded thereto, and having triangular gusset plates 26 interconnecting the arms 17 and bracing member 25 to form a rigid structure. The arms 17 extend forwardly beyond the brace 25 and carry between them a tool supporting frame 30. The frame 30 includes a pair of end portions, each including a vertical channel member 31, a generally horizontal channel member 32, and an inclined channel member 33, the three channel members being rigidly secured together in a triangular shaped, preferably by welding, and the rear ends of the two generally horizontal channel members 32 are interconnected by a transverse tubular frame member 34, rigidly welded at opposite ends, respectively, to the two frame members 32. Each of the main supporting arms 17 and the lower end of the adjacent vertical frame member 31 are swingably interconnected for relative rocking movement about a common transverse axis by means of a pair of coaxial pivot pins 35.

Thus, the frame 30 is generally U-shaped in plan view, and serves as a supporting cradle for a material handling tool in the form of a bucket 36 having a curved plate 37 serving as a bottom and back wall, and a pair of laterally spaced generally vertical side plates 38. The bucket is provided with a plurality of laterally spaced digging teeth 39, each of which comprises a structural angle member curved along the inside of the bottom plate 37 and extending forwardly from the forward edge of the latter, the forward points of the teeth 39 being sharpened to facilitate engaging the pile of material to be handled. The pivot pins 35 are rigidly mounted on the side plates 38 of the bucket, respectively, providing for rocking movement of the bucket 36 about the transverse axis of the pivot pins 35 relative to the cradle or frame 30 and also relative to the supporting arms 17, for purposes to be described later.

A pair of control links 40 are pivotally connected to the upper ends of the vertical frame members, respectively, by means of transversely aligned pivot pins 41. The control links 40 extend rearwardly above and parallel to the main supporting arms 17, respectively, and are pivotally connected at their rear ends at 42 to a pair of manually actuated levers 43, at points spaced beneath the pivot supports 44 of the levers 43. The lever pivots 44 are supported on a pair of substantially vertical plates 45, which are rigidly fixed to the mast members 21, respectively. The two levers 43 are inclined laterally inwardly toward the tractor seat 46, to bring them within reach of the tractor operator, so that by swinging the levers 43 about their pivots 44, the operator can shift the control links 40 longitudinally to rock the cradle or frame 30 about its transverse axis of the pivot pins 35. Normally, the bucket 36 is secured to the cradle 30 by means of latch mechanism 50, to be described later, so that by rocking the cradle 30 the operator also tilts the bucket 36 to raise and lower the forward ends of the digging teeth 39 about the axis of the transverse pivots 35. Each of the levers 43 is provided with a latch rod 51, which is shiftable along the lever 43 into engagement with any of several apertures 53 in a curved plate 52 fixed to the outer side of the associated supporting plate 45. Thus, the rear pivots 42 of each of the control links 40 can be fixed in longitudinally adjusted position, so that as the arms 17 are raised and lowered to raise and lower the bucket 36, the cradle 30 and bucket 36 are maintained in a substantially constant angular position relative to the ground.

The upper ends of the masts 21 are braced by a pair of inclined bracing members 55, and connected by a pin 56 at their upper ends to the upper ends of the masts 21, respectively, and converging forwardly and downwardly and are secured by bolts 57 at their forward ends to the sides of the tractor body 11, respectively.

The main supporting arms 17 are raised and lowered to raise and lower the bucket 36, by a clutch and brake assembly 60, the details of which are not essential to an understanding of the present invention, but are fully disclosed in my co-pending application, Serial No. 649,332, filed February 21, 1946. It is deemed sufficient to relate that the clutch and brake are journaled on a shaft 61 which is mounted on a pair of side frame members 62, the latter being swingably mounted on a transverse rockshaft 63 supported between a pair of plates 45, 45' which are rigidly secured to the rear axle housing 13. The opposite ends of the side frame members 62 are mounted on bolts 64 slidably supported on slotted brackets 65 fixed to the tractor axle housing 13.

The clutch and brake mechanism receives power through a V-belt 70, trained over a driving sheave 71, which is fixed to the flywheel 72 on the tractor crankshaft, and delivers power through a sprocket 73 journaled on the shaft 61 and a drive chain 74 which is trained over the sprocket 73 and over a driven sprocket 75, which is mounted on a winding drum 76 fixed to a transverse shaft 77, the latter being journaled on suitable brackets mounted on the masts 21. A similar winding drum 78 is mounted coaxially with the winding drum 76 and is disposed ahead of and below the opposite tractor axle housing 13. A connecting shaft 79 is coupled between the supporting shafts of the two drums 76, 78 by means of readily detachable couplings 80, which permit the coupling shaft 79 to be removed to allow the tractor to be driven rearwardly from between the two supporting arms 17.

Each of the winding drums 76, 78 is provided with a cable 81 which is wound on the drum and extends forwardly therefrom alongside of the associated supporting arm 17, and passes over a pulley 82 mounted on a shaft 83 which is carried between a pair of connecting straps 84, the latter being pivotally connected by a bolt 85 to a triangular plate 86, which is welded to the arm 17 near the forward end thereof. The cable passes over the pulley 82 and extends upwardly and rearwardly therefrom and is trained over a pulley 90, which is rotatably mounted on the forward end of a bar 92 by means of a shaft 91. The bar 92 extends upwardly and rearwardly and is swingably connected to the pivot pin 56 at the upper end of the mast 21. The cable 81 passes over the pulley 90 and extends downwardly and forwardly to a smaller pulley 93, mounted on a shaft 94, which is carried between the straps 84, and extends upwardly and rearwardly therefrom to an anchor lug 95 which is bolted between a pair of plates 96, which are secured to the forward end of the bar 92.

The clutch and brake assembly 60 is controlled by a foot lever 97 secured to the transverse shaft 63, which is a master control shaft for controlling the power applied through the sprocket 73 to the winding drums 76, 78. The driving sheave 71 drives the assembly 60 at a constant speed, and normally the sprocket 73 and winding drums 76, 78 are stationary and are held against movement by suitable brake mechanism. The operator can release the brake mechanism by pressing downwardly on the foot lever 97, while further downward pressure on the foot lever 97 engages the clutch mechanism, causing the winding drums 76, 78 to be rotated to wind up the two cables 81, respectively, thereby causing the arms 17 to be raised from the position shown in solid lines in Figure 2 to the position shown in dotted lines, the arms 17 swinging upwardly about the pivots 20 and the control links 40 swinging upwardly about their rear pivot connections 42. The arms 17 and bucket 36 can be held in any raised position by releasing the operating lever 97, which applies the brake to the assembly 60 and holds the winding drums 76, 78 against rotation. The bucket can be lowered by releasing the brake as explained above, whereupon the weight of the arms and bucket causes the cables 81 to be unwound from the winding drums 76, 78 as the bucket descends.

Reference may be had to my co-pending application for a complete description of the clutch and brake assembly, although it is to be understood that the present invention is not limited to this particular device, for any suitable means can be used for operating the winding drums 76, 78.

The bucket latch mechanism 50 comprises a rockshaft 100 extending transversely behind the bucket 36 above the transverse frame member 34 and supported in suitable apertures in three upstanding brackets 101, 102, 103, which are rigidly fixed, as by welding, to the frame members 32, 34 of the cradle 30. A pair of latch arms 105, 106 are mounted on the rockshaft 100 adjacent opposite ends thereof, respectively. Each of the latch arms 105, 106 comprises a pair of axially spaced arm members 107 which are welded at their upper ends to the rockshaft 100 and a roller 108 between the outer ends of the arm members 107 and journaled on the latter by means of a pin 109. Each of the rollers 108 is adapted to swing into and out of a recess 110 in a lug 111. The two lugs 111 are formed as a pair of castings which are secured to the two side plates 38 of the bucket 36 by bolts 112 (see Figure 5). A structural angle member 113 extends across the back wall of the bucket 36 and interconnects the castings 111 for strengthening purposes. It will be noted that the lugs 111 are recessed at 114 to bear upon the transverse tubular frame member 34 and are secured in contact with the latter by means of the latch rollers 108, thereby preventing any rocking movement of the bucket 36 with respect to its frame or cradle 30.

The latch arms 105, 106 are disengaged from the lugs 111 by means of a manually actuated lever 115, rigidly secured to the rockshaft 100 and provided with a rope 116 extending to a position accessible to the operator of the tractor. By pulling the rope 116 the rockshaft 100 can be rocked to swing the latch arms 105, 106 rearwardly out of the recesses 110 in the lugs 111 to release the bucket 36 for dumping. The latch arms 105, 106 are urged toward latching position by means of a pair of tension springs 120 at opposite sides of the frame 30, connected to a pair of arms 121 fixed to the rockshaft 100, the springs 120 being anchored to lugs 122, secured to the generally horizontal channel frame members 32, respectively. These springs 120 are stressed in tension when the operator pulls the rope 116 and swings the latch arms 105, 106 rearwardly, with the result that when the rope 116 is released, the springs 120 swing the latch arms 105, 106 forwardly by rocking the rockshaft 100 through the arms 121.

The bucket 36 is so balanced on the pivot members 35, that the greater part of the weight of the bucket is behind the pivot axis, thereby causing the bucket to be returned by gravity to its normal carrying position. The bucket is dumped by means of a dump control rope or cable 125 that is secured at 126 to the bottom of the bottom plate 37 of the bucket and extends rearwardly therefrom, being trained upwardly and rearwardly around the curved lower plate 37 of the bucket. The rope 125 makes a complete turn around a pulley 126 which is provided with a stub shaft 127 journaled in a pair of side plates 128, which are provided with lever extensions 129 spaced apart to receive therebetween a lever arm 130 fixed to the rockshaft 100. The arms 129 are pivotally connected by a pin 131 to the lever arm 130. The arm 130 lies substantially in the same transverse plane with the latch arms 105, 106, which in latched position, incline slightly forwardly from the vertical, as best shown in Figure 5, so that the pulley supporting arms 129 bear against the tubular frame member 34 and are inclined downwardly and rearwardly from the pivot pin 131, thereby forming an obtuse angle between the arms 129 and the lever arm 130. The cable or rope 125 extends downwardly and rearwardly from the pulley 126 and is trained around a pulley 132 mounted on an arm 133 that is pivotally connected at 134 to a bracket 135 fixed to the front end of the tractor body 11. The rope returns upwardly and forwardly and is secured by means of an anchor connection 136 to the transverse bracing member 25 between the arms 17.

The rope 125 is slack, as indicated in Figure 2, when the bucket is in lowered position, but it is tightened as the arms 17 and bucket 36 are raised, until the tension in the rope 25 pulling downwardly on the pulley 126, straightens the pivotally interconnected arms 129, 130, thereby rocking the rockshaft 100 in a counterclockwise direction, as viewed in Figure 5, thereby swinging the latch arms 105, 106 to disengage the rollers 108 from the lugs 11. This does not, in itself, cause the bucket to dump, but further upward movement of the arms 17 and bucket 36, acting through the rope, pulls the bucket in a counterclockwise direction from the carrying position of Figure 3 to the dumping position of Figure 4, the latter being attained by moving the lifting arms 17 to the extreme upper limit of their range of vertical movement.

When the arms 17 are lowered, the rope 125 is slackened, permitting the weight of the bucket 36 to cause the latter to return to the carrying position of Figure 3. The lower surfaces 114 of the lugs 111 engage the rollers 108 as the bucket reaches the carrying position, forcing the latch arms 105, 106 outwardly against the tension of the springs 120, which pull the latch arms forwardly as the rollers roll into the recesses 110 and the lower recesses 114 on the lugs 111 engage the tubular frame member 34, after which the bucket is rigidly held in carrying position. Thus, it is evident that the operator does not have to control the dumping of the bucket through the rope 116, for the bucket is automatically dumped by the control rope 125 as the lifting arms 17 approach the upper limit of their range of movement. The manually operated rope 116 is used only when it is desired to release the latch arms 105, 106 before the bucket is raised to its highest position.

The loader can be used for handling a wide variety of material, but the bucket shown and described herein is designed particularly for loading manure into a manure spreader. It will be noted from Figure 2, that an ample lift can be obtained although, as explained hereinbefore, the structure of the loader does not increase the over-all height of the tractor, and therefore it is suitable for cleaning out barns and sheds. By using various conventional shapes of buckets and scraper blades, in place of the illustrated bucket 36, the implement can be used for handling sand, gravel, crushed rock, or snow, grain, and many other materials, or can be used as a bulldozer for earth working operations.

The levers 43 can be shifted forwardly to tilt the forward edge of the bucket into more aggressive scraping action on the ground, or the levers 43 can be swung rearwardly to tilt the forward edge of the bucket or the ends of the teeth 39 slightly upwardly so that they will slide over the ground without digging in. One advantage of the dumping mechanism disclosed herein, is that when handling adhesive material such as manure, the bucket can be agitated or rocked about its pivot supports 35 to shake the material into a wagon or spreader, merely by raising and lowering the arms 17 slightly at the top of their range of movement. This is accomplished simply by alternately pressing and releasing the operating foot pedal 97, thereby making it unnecessary to scrape the bucket out by hand during operation.

The implement can be readily removed from the tractor by removing the bolts from the tractor axle housings 13, which support the masts 21 and winding drums thereon, and removing the connecting shaft 79 by disengaging the couplings 80, thereby permitting the tractor 10 to be backed out from between the arms 17, after the pivot bolt 134 holding the lower pulley 132, has been removed, and the braces 55 have been disconnected from the sides of the tractor by removing the bolts 57.

I do not intend my invention to be limited to the specific details shown and described herein, except as set forth in the claims which follow.

I claim:

1. For use with a tractor having a longitudinally extending body carried on a pair of opposed laterally extending rear axle housings, a pair of supporting arms for pivotal mounting on the tractor axle housings, respectively, to extend forwardly along opposite sides of said body, respectively, a material handling tool for disposition ahead of such tractor and pivotally mounted on the forward ends of said arms, a pair of mast members for mounting on said axle housings, respectively, and having inclined braces extending forwardly therefrom for attachment to the tractor body, and power operated lifting means for said arms comprising a pair of drums journaled for rotation about a transverse axis near the rear pivot axis of said arms, cables extending forwardly from said drums alongside and substantially parallel to said arms, respectively, a pair of sheaves mounted on said arms and a second pair of sheaves connected to the upper portions of said masts, respectively, each of said cables being trained over one of each of said first and second pairs of sheaves, power actuated means for rotating said drums, a pair of control links pivotally connected at their forward ends to said tool on an axis spaced generally vertically from the pivot axis of said arms and extending rearwardly alongside said body, pivot supports for the rear ends of said links, and means for shifting said pivot supports fore and aft relative to said body.

2. For use with a tractor having a longitudinally extending body carried on a pair of opposed laterally extending rear axle housings, a pair of mast members for mounting on the tractor axle housings, respectively, to extend upwardly and downwardly therefrom, inclined braces attached to the upper portions of said mast members and extending forwardly therefrom for attachment at their forward ends to the sides of the tractor body, a pair of supporting arms pivotally mounted on lower portions of said mast members beneath said axle housings, respectively, for vertical swinging movement about a common transverse axis, a material handling tool for disposition ahead of such tractor and carried on the forward ends of said arms, and power operated lifting means for said arms comprising a pair of drums journaled for rotation about a transverse axis near the rear pivot axis of said arms, cables extending forwardly from said drums alongside and substantially parallel to said arms, respectively, a pair of sheaves mounted on said arms and a second pair of sheaves connected to the upper portions of said masts, respectively, each of said cables being trained over one of each of said first and second pairs of sheaves, and power actuated means for rotating said drums.

3. For use with a tractor having a longitudinally extending body carried on a pair of opposed laterally extending rear axle housings, a pair of mast members for mounting on the tractor axle housings, respectively, to extend upwardly and downwardly therefrom, inclined braces attached to the upper portions of said mast members and extending forwardly therefrom for attachment at their forward ends to the sides of the tractor body, a pair of supporting arms pivotally mounted on lower portions of said mast members beneath said axle housings, respectively, for vertical swinging movement about a common transverse axis, a material handling tool for disposition ahead of such tractor and pivotally mounted on the forward ends of said arms for rocking movement about a transverse axis, power operated lifting means for said arms comprising a pair of drums journaled for rotation about a transverse axis near the rear pivot axis of said arms, cables extending forwardly from said drums alongside and substantially parallel to said arms, respectively, a pair of sheaves mounted on said arms and a second pair of sheaves connected to the upper portions of said masts, respectively, each of said cables being trained over one of each of said first and second pairs of sheaves, power actuated means for rotating said drums, a pair of control links pivotally connected at their forward ends to said tool on an axis spaced generally vertically from the pivot axis of said arms to extend rearwardly alongside the tractor body, pivot supports for the rear ends of said links, and means for shifting said pivot supports fore and aft relatively to the tractor body.

4. An implement for use with a supporting frame, comprising a pair of laterally spaced, longitudinally extending supporting arms having means for pivotal connection with such frame, a tool support pivotally mounted between said arms outwardly of said first pivot connection, a tool pivotally mounted on said support and rockable independently of the latter, releasable means for locking said tool relative to said tool support, a control element constructed and arranged to be shiftably mounted on said frame, a control link pivotally connected to said element and to said tool support, means for raising and lowering said arms, said control element being adapted to rock said tool support about its transverse pivot axis, and means responsive to raising said arms for releasing said locking means when said tool is raised beyond a predetermined elevation.

5. An implement for use with a supporting frame, comprising a pair of laterally spaced supporting arms having means for pivotal connection at their rear ends to such frame on a transversely disposed axis and extending forwardly therefrom, a tool pivotally connected to the forward ends of said arms and shiftable vertically by vertical swinging movement of the latter about said transverse axis, said tool being shiftable relative to said arms about said pivot connection at the forward ends of said arms between a carrying position and a dumping position, releasable means for locking said tool in said carrying position, means for swinging said arms, and a connection between said locking means and said frame for releasing said locking means responsive to upward movement of the tool beyond a predetermined position, thereby permitting movement of said tool to said dumping position.

6. A material handling implement for use with a supporting frame, comprising a vertically swingable support for pivotal mounting on said frame, a bucket rockably mounted on said support by means providing for rocking movement between a carrying position and a dumping position, releasable means for retaining said bucket in carrying position, means for swinging said support to raise said bucket, a flexible cable connectible between said bucket and the frame for dumping said bucket by force transmitted through said cable when said bucket is raised beyond a predetermined elevation, and a sheave connected to said retaining means and engaging said cable means, whereby said retaining means is released by force transmitted through said cable prior to dumping the bucket.

7. A material handling implement for use with a supporting frame, a vertically swingable support for pivotal mounting on said frame, a bucket rockably mounted on said support by means providing for rocking movement between a carrying position and a dumping position, a releasable latch for retaining said bucket in said carrying position comprising a rockshaft mounted on said support and having a latch element engageable with said bucket and a release arm, a sheave mounted on said arm, a flexible cable attached to said bucket and trained over said sheave, and means for connecting said cable with the frame, whereby raising said support and bucket tightens said cable, thereby actuating said rockshaft through said sheave and release arm to disengage said latch element from said bucket, further tightening of said cable serving to rock said bucket into said dumping position.

8. For use with a tractor having a longitudinally extending body, a pair of supporting arms for pivotal mounting near the rear of the tractor to extend forwardly along opposite sides of the tractor body, respectively, a bucket rockably supported between said arms by means providing for rocking movement between carrying and dumping positions, a rockshaft supported on said arms behind said bucket and having latch means engageable with said bucket for retaining the latter in carrying position, a release arm fixed to said shaft, a sheave journaled on an arm pivoted to said release arm and normally disposed at an angle thereto when said latch means is engaged with said bucket, a flexible cable attached to the bottom of said bucket and trained over said sheave, and means for connecting said cable with the tractor body, whereby raising said supporting arms and said bucket tightens said cable, therby straightening said sheave and release arms to disengage said latch means from said bucket, further tightening of said cable serving to rock said bucket into said dumping position.

9. For use with a tractor having a longitudinally extending body, a pair of supporting arms for pivotal mounting near the rear of said tractor to extend forwardly along opposite sides of the tractor body, respectively, a bucket rockably supported between said arms by means providing for rocking movement between carrying and dumping positions, a rockshaft supported on said arms behind said bucket, a pair of laterally spaced latch lugs mounted on the rear of said bucket, a pair of latch dogs fixed to said rockshaft and rockable therewith into latching engagement with said lugs to retain said bucket in said carrying position, a release arm fixed to said shaft, a sheave supported on said release arm, a flexible cable attached to the bottom of said bucket and trained over said sheave, and means for connecting said cable with the tractor body, whereby raising said supporting arms and said bucket tightens said cable, thereby rocking said rockshaft to disengage said dogs from said lugs, further raising of said supporting arms transmits a pulling force through said cable serving to rock said bucket into said dumping position.

10. An implement for use with a supporting frame, a pair of laterally spaced, longitudinally extending supporting arms having means providing a pivotal connection with the frame, a tool support pivotally mounted between said arms outwardly of said pivot connection, a tool pivotally mounted on said support and rockable independently of the latter, releasable means for locking said tool relative to said tool support, a control element shiftably mounted on said frame, a control link pivotally connected to said element and to said tool support, means for raising and lowering said arms, said control element being adapted to rock said tool support about its pivot axis, and means responsive to raising said arms for releasing said locking means and rocking said tool to dump the latter when said tool is raised beyond a predetermined elevation.

HAROLD M. STUELAND.

(References on following page)

REFERENCES CITED

The following references are of record in the file of this patent:

UNITED STATES PATENTS

| Number | Name | Date |
|---|---|---|
| 1,527,251 | Furst | Feb. 24, 1925 |
| 1,733,969 | Knapp, Jr. | Oct. 29, 1929 |
| 1,973,950 | Frank | Sept. 18, 1934 |
| 2,149,381 | Young | Mar. 7, 1939 |
| 2,298,200 | Court | Oct. 6, 1942 |
| 2,353,949 | Warren | July 18, 1944 |
| 2,357,954 | Johnson | Sept. 12, 1944 |
| 2,393,299 | Denning | Jan. 22, 1946 |
| 2,394,830 | Woodin | Feb. 12, 1946 |
| 2,398,119 | Sauder | Apr. 9, 1946 |
| 2,402,908 | Neville et al. | June 25, 1946 |
| 2,404,820 | Wuertz et al. | July 30, 1946 |
| 2,412,570 | Ender | Dec. 17, 1946 |